(12) United States Patent
Semba et al.

(10) Patent No.: US 6,265,795 B1
(45) Date of Patent: Jul. 24, 2001

(54) ROTATING MACHINE

(75) Inventors: Akitomi Semba, Hitachi; Tadashi Sonobe, Iwaki; Takashi Watanabe, Hitachi; Yasuomi Yagi, Hitachi; Junji Sato, Hitachi; Shinsaku Hakuta, Hitachi; Hideaki Mori, Chiyoda-machi; Eiji Tsuji, Hitachi; Kenichi Hattori, Hitachi; Atsushi Ishihara, Hitachi, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/587,292

(22) Filed: Jun. 5, 2000

Related U.S. Application Data (62) Division of application No. 09/443,105, filed on Nov. 18, 1999.

(30) Foreign Application Priority Data

Nov. 25, 1998 (JP) .................................................. 10-333675
Mar. 17, 1999 (JP) .................................................... 11-71408

(51) Int. Cl.$^7$ ....................................................... H02K 9/00
(52) U.S. Cl. ................................. 310/52; 310/57; 310/58; 310/59
(58) Field of Search ................................. 310/52, 55, 57, 310/58, 59, 62, 63

(56) References Cited

U.S. PATENT DOCUMENTS

| | | | |
|---|---|---|---|
| 3,739,208 | * | 6/1973 | Shartrand ............................. 310/58 |
| 4,141,669 | * | 2/1979 | Darby et al. ......................... 310/59 |
| 4,260,327 | * | 4/1981 | Armor et al. ....................... 415/200 |
| 4,465,947 | * | 8/1984 | Armor et al. ......................... 310/59 |

FOREIGN PATENT DOCUMENTS

| | | |
|---|---|---|
| 2-70247 | 3/1990 | (JP) . |
| 60-162432 | 8/1995 | (JP) . |

\* cited by examiner

*Primary Examiner*—Joseph Waks
(74) *Attorney, Agent, or Firm*—Antonelli, Terry, Stout & Kraus, LLP (57) ABSTRACT

A rotating machine having a core and being equipped with coolers for cooling a cooling medium which is circulated inside the machine by the rotation of a fan installed near the rotating axis. The coolers are installed in a ventilation passage for the cooling medium and comprise a primary cooler installed in a primary ventilation passage extending from the exhaust side of a fan installed near the rotating axis to the suction side of said fan via the core, and a secondary cooler installed in a secondary passage that is branched from the primary ventilation passage.

20 Claims, 5 Drawing Sheets

ROTATING MACHINE

CROSS REFERENCE TO RELATED APPLICATION

This is a divisional of U.S. application Ser. No. 09/443,105, filed Nov. 18, 1999, the subject matter of which is incorporated by reference herein.

BACKGROUND OF THE INVENTION

The present invention relates to a rotating machine that is equipped with coolers in the ventilation passage where a cooling medium flows to cool the machine. In a conventional rotating machine, as described in Japanese application patent laid-open publication Nos. Sho 60-162432 (1985) or Hei 2-70247 (1990), for example, ventilation passages where a cooling medium flows are formed symmetrically about the rotating axis and an axis perpendicular to the rotating axis, and multiple coolers for cooling the cooling medium are arranged symmetrically about an axis perpendicular to the rotating axis and on top of the rotating machine. Besides, each cooler has the same cooling capacity.

In the above stated conventional rotating machine, however, if the heat load increases as the generating capacity increases, a significant temperature difference is created in the cooling medium depending upon the distance from each cooler and local heat is generated inside the machine, particularly in the so-called air gap, which is the gap between the stator core and the rotor core. If local heat is generated in the air gap, uneven thermal elongation is caused in the rotor along the axial direction, and, resultantly, the thermal vibration stroke of the rotor is likely to become excessive.

Increasing the heat exchange capacity of the coolers, that is, increasing the size of the coolers may be a means for solving the above problem. However, while the absolute value of the temperature increase distributed along the axial direction in the air gap and the absolute value of the local heat can be reduced by this means, the temperature increase distributed along the axial direction in the air gap cannot be equalized simply by increasing the heat exchange capacity of the coolers. Besides, the cooling medium is not utilized efficiently in the above solution, because the air gap is additionally cooled even though it is already being cooled sufficiently and requires no further cooling.

SUMMARY OF THE INVENTION

The present invention provides a rotating machine where, by equalizing the temperature increase distribution inside the machine, no uneven thermal elongation is caused along the axial direction of the rotor, and, resultantly, the thermal vibration stroke of the rotor will not be excessive.

The basic characteristic of the present invention resides in the fact that a main cooler and a sub cooler are arranged and configured so that at least part of the cooling medium that has been cooled by the main cooler is further cooled by the sub cooler That is, the cooling medium is cooled twice by the coolers. As a result, it is possible to supply sufficiently cooled cooling medium to the so-called air gap, which is the gap between the stator and the rotor, along the entire axial direction. As a result, because local heat along the axial direction in the air gap can be restricted and the temperature increase distributed along the axial direction in the air gap can be equalized, no uneven thermal elongation is caused along the axial direction of the rotor and the thermal vibration stroke of the rotor will not be excessive.

The sub cooler is smaller in size than the main cooler, that is, it has a smaller cooling capacity. The cooling capacity can be smaller because the sub cooler is used to cool part of the cooling medium that has already been cooled by the main cooler, and this combination provides more efficient cooling. Because the sub cooler is arranged midway in the branch duct from the exhaust side of the fan to the outer side of the stator core, that is, in a smaller space than the space where the main cooler is arranged, it must be small in size for ease of installation. For this reason, when viewing the rotating machine from the outside, it is seen that a larger cooler, which is the main cooler, and a smaller cooler, which is the sub cooler, are arranged in series along the axial direction.

DESCRIPTION OF THE INVENTION

The following description is directed to various embodiments according to the present invention.

A rotating machine is equipped with coolers for cooling the cooling medium charged inside the machine, which coolers include primary coolers which are arranged on both ends along the axial direction of the rotating machine, and at least one secondary cooler which is arranged between said primary coolers and is smaller in size than said primary coolers.

A rotating machine is equipped with coolers for cooling the cooling medium charged inside the machine, which coolers include multiple primary coolers which are arranged separately along the axial direction of the rotating machine and a secondary cooler which is arranged between said primary coolers and is smaller in size than said primary coolers.

In the above stated rotating machine, the coolers are arranged on top of the rotating machine.

A rotating machine is equipped with coolers for cooling the cooling medium which is circulated inside the machine by the rotation of a fan installed in the vicinity of the rotating axis, which coolers comprise two or more coolers installed in a ventilation passage for said cooling medium, wherein at least part of the cooling medium cooled by one cooler is further cooled by another cooler.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in a primary ventilation passage extending from the exhaust side of a fan installed near the rotating axis to the suction side of said fan via the core, and a secondary cooler installed in a secondary ventilation passage that is branched from said primary ventilation passage.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in a primary ventilation passage extending from the exhaust side of a fan installed near the rotating axis to the suction side of said fan via the core, and a secondary cooler installed at a point of joint in a secondary ventilation passage that is branched from said primary ventilation passage and is joined with another ventilation passage midway at the point of said joint.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in a primary ventilation passage extending from the exhaust side of a fan installed near the rotating axis to the suction side of said fan via the core, a secondary cooler installed in a secondary ventilation passage that is branched from said primary ventilation passage, and a tertiary cooler installed at a point of joint in a tertiary ventilation passage that is branched from said primary ventilation passage and is joined with another ventilation passage midway at the point of said joint.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in a primary ventilation passage extending from the exhaust side of a fan installed near the rotating axis to the suction side of said fan via the stator core, and a secondary cooler installed in a secondary ventilation passage extending from the exhaust side of the fan in said primary ventilation passage to the inside of the stator core via ducts in the stator core.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in the primary ventilation passage extending from the exhaust side of a fan installed near the rotating axis to the suction side of said fan via the stator core, and a secondary cooler installed at a point of a joint in the secondary ventilation passage that extends from the exhaust side of the fan in said primary ventilation passage to the inside of the stator core via ducts in the stator core and meets another ventilation passage before reaching the stator core.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in the primary ventilation passage extending from the exhaust side of a fan installed near the rotating axis to the suction side of said fan via the stator core, a secondary cooler installed in a secondary ventilation passage that extends from the exhaust side of the fan in said primary ventilation passage to the inside of the stator core via ducts in the stator core, and a tertiary cooler installed at a point of a joint in a tertiary ventilation passage that extends from the exhaust side of the fan in said primary ventilation passage to the inside of the stator core via the ducts in the stator core and meets another ventilation passage before reaching the stator core.

In the rotating machine, thermal insulation is provided on the walls of the ventilation passage extending from the exhaust side of the fan in the primary ventilation passage to the stator core.

In the above-stated rotating machine, the stator core is equipped along the axial direction with multiple ventilation ducts through which the cooling medium is circulated along the radial direction, and also the ventilation area per unit length of said ventilation ducts is varied according to the ventilation direction of the cooling medium.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in the primary ventilation passage extending from the exhaust side of a fan installed near the rotating axis to the suction side of said fan via the stator core, and a secondary cooler installed in a secondary ventilation passage that extends from before the primary cooler in said primary ventilation passage to the exhaust side of the fan via the end of the stator core.

A rotating machine is equipped with coolers for cooling the cooling medium which is circulated inside the machine by the rotation of a fan installed in the vicinity of the rotating axis, which coolers are installed in a ventilation passage for said cooling medium and comprise a primary cooler installed in a primary ventilation passage extending from the exhaust side of a primary fan installed on one end of the rotating axis to the suction side of said primary fan via the core, and a secondary cooler installed in a secondary ventilation passage, which is shorter in length than the primary ventilation passage, extending from the exhaust side of a secondary fan installed on the other end of the rotating axis to the suction side of said secondary fan via the core.

The embodiments of the present invention will be explained below with reference to the accompanying drawings.

EMBODIMENT 1

Figure 1:
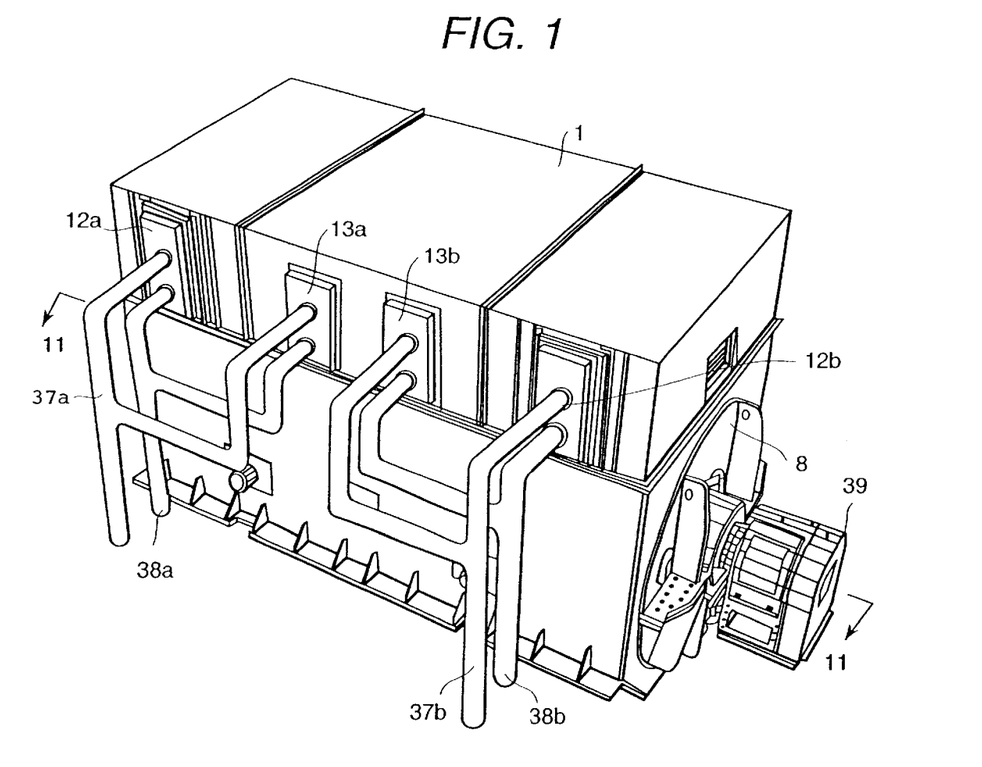
FIG. 1 is a perspective view of the overall composition of a turbine generator according to the embodiment 1 of the present invention.
Figure 2:
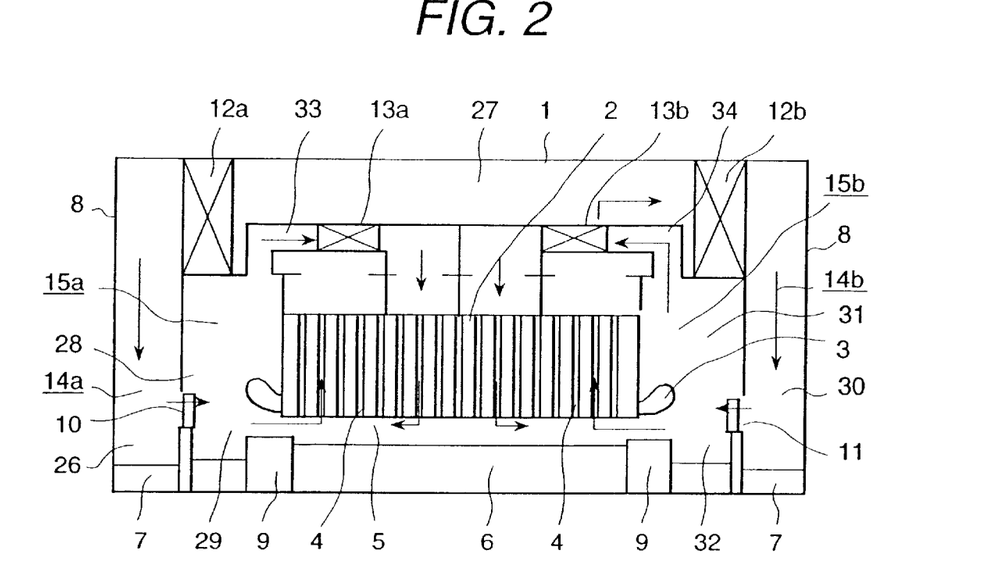
FIG. 2 is a sectional view taken on line II—II in FIG. 1.

FIG. 1 shows the overall composition of a turbine generator according to an embodiment 1, and FIG. 2 is a sectional view taken on line II—II of FIG. 1. As seen in FIG. 2, a cylindrical stator core 2 is provided inside a stator housing. Multiple continuous slots are formed on the inner surface of the stator core 2, and a stator winding 3 is enclosed inside the slots. Multiple continuous ventilation ducts 4 are provided on the stator core 2 along its radial direction at a nearly equal axial pitch.

The rotor core 6 is provided inside the stator core 2 leaving a so-called air gap 5. The rotating shaft 7, which is formed into one piece with the rotor core 6, extends from both ends of the rotor core 6 along the axial direction and is supported by a bearings mounted inside the end bracket 8 covering both ends of the stator housing 1. Multiple slots are formed on the outer surface of the rotor core 6, and a rotor winding is enclosed inside the slots. Both ends of the rotor winding are fastened by a retaining ring 9.

A pair of fans 10 and 11 are respectively provided at each end of the rotating shaft 7. The fans 10 and 11 rotate along with the rotating shaft 7 and circulate charged cooling medium, such as air or hydrogen gas, in the machine. Multiple ventilation passages for smooth circulation of the cooling medium are provided inside the machine and are disposed symmetrically about the rotating shaft 7 and an axis perpendicular to the rotating shaft 7. Multiple coolers are arranged midway in the ventilation passages and, at the same time, on top of the generator. The specific composition of the ventilation passages and arrangement of the coolers depend upon the ventilation system of the cooling medium. According to this embodiment, a so-called multi-flow system is employed, where the cooling medium cooled by the coolers circulates in two directions, through the ventilation ducts 4, along the outside of the stator core 2 and through the air gap 5.

For this purpose, a primary ventilation passage 14a is arranged to run inside the machine, and it comprises a ventilation passage 26 extending from the inner surface of the stator housing 1 to the suction side of the fan 10, a ventilation passage 29 extending from the exhaust side of the fan 10 to the air gap 5, the air gap 5, the ventilation ducts 4, and a ventilation passage 27 disposed between the outside of the stator core 2, including a space opposite to the outside of the end spaces of the stator core 2, and the inner surface of the stator housing 1. The main or primary cooler 12a is installed in the ventilation passage 27 which is part of the primary ventilation passage 14a on the opposite side to the fan 10.

A primary ventilation passage 14b is also arranged to run inside the machine, and it comprises a ventilation passage 30 extending from the stator housing 1 to the suction side of the fan 11, a ventilation passage 32 extending from the exhaust side of the fan 11 to the air gap 5, the air gap 5, the ventilation ducts 4, and the ventilation passage 27 disposed between the stator core 2, including a space opposite to the outside of the end spaces of the stator core 2, and the stator housing 1. The main or primary cooler 12b is installed in the ventilation passage 27 opposite to the fan 11.

A secondary ventilation passage 15a is arranged to run between the exhaust side of the fan 10 and the air gap 5, and it comprises a ventilation passage 28 consisting of the end space at the fan 10 side of the stator core 2, a ventilation passage 33 extending from the ventilation passage 28 to the outer side of the stator core 2, and the ventilation ducts 4. The sub or secondary cooler 13a is installed midway in the ventilation passage 33. A secondary ventilation passage 15b is arranged to run between the exhaust side of the fan 11 and the air gap 5, and it comprises a ventilation passage 31 consisting of the end space at the fan 11 side of the stator core 2, a ventilation passage 34 extending from the ventilation passage 31 to the outer side of the stator core 2, and the ventilation ducts 4. The sub or secondary cooler 13b is installed midway in the ventilation passage 34.

The primary ventilation passage 14a and the secondary ventilation passage 15a are arranged symmetrically about an axis perpendicular to the rotating shaft 7, and so are the primary ventilation passage 14b and the secondary ventilation passage 15b. The main cooler 12 and the sub cooler 13 differ in cooling capacity, and, according to this embodiment, the cooling capacity of the sub cooler 13 is smaller than that of the main cooler 12. Accordingly, the sub cooler 13 is smaller in size than the main cooler 12. The main coolers 12a and 12b are arranged symmetrically about an axis perpendicular to the rotating shaft 7, and so are the sub coolers 13a and 13b. Viewing the rotating machine from the outside, it is seen that the main cooler 12 and the sub cooler 13 are arranged in series along the axial direction on top of the machine, such that the main or primary coolers 12a and 12b are located on both ends along the axial direction, and the sub or secondary coolers 13a and 13b are arranged between the main coolers 12a and 12b.

The cooling water supply pipe 37a for supplying cooling water and the cooling water discharge pipe 38a for discharging cooling water are connected to the main cooler 12a and the sub cooler 13a. The cooling water supply pipe 37b for supplying cooling water and the cooling water discharge pipe 38b for discharging cooling water are connected to the main cooler 12b and the sub cooler 13b.

Although the cooling water supply pipe 37a and the cooling water discharge pipe 38a are connected common to the main cooler 12a and the sub cooler 13a, and the cooling water supply pipe 37b and the cooling water discharge pipe 38b are connected common to the main cooler 12b and the sub cooler 13b according this embodiment, it is possible to connect an individual cooling water supply pipe and cooling water discharge pipe to each cooler, or to connect pipes in common to the main coolers 12a and 12b and also to the sub coolers 13a and 13b. Reference numeral 39 in FIG. 1 represents the current collector to supply power to the rotor winding.

Hereunder, the circulation of the cooling medium will be explained. The cooling medium cooled by the main cooler 12a is circulated, as it cools the ventilation passage 26, toward the suction side of the fan 10 by the rotation of the fan 10, and is branched at the exhaust side of the fan 10 into the ventilation passage 28 and the ventilation passage 29. The cooling medium, which is branched into the ventilation passage 29, is circulated toward the main cooler 12a as it cools the lower end of the rotor core 6 at the fan 10 side in the ventilation passage 29, the inner surface of the stator core 2 and the outer surface of the rotor core 6 in the air gap 5, the inside of the stator core 2 via the ventilation ducts 4, and the gap between the stator core 2 and the stator housing 1 in the ventilation passage 27, sequentially.

The cooling medium, which is branched into the ventilation passage 28, is circulated toward the ventilation passage 33 as it cools the upper end of the stator core 2 at the fan 10 side and the end of the stator winding 3 in the ventilation passage 28. The cooling medium circulated through the ventilation passage 33 is cooled by the sub cooler 13a on its way. The cooling medium cooled by the sub cooler 13a reaches the outer surface of the stator core 2, cools the inside of the stator core 2 via the ventilation ducts 4 and the inner surface of the stator core 2 and the outer surface of the rotor core 6 in the air gap 5, sequentially, and then meets with the cooling medium from the ventilation passage 29 and is circulated together therewith toward the main cooler 12a.

On the other hand, the cooling medium which is cooled by the main cooler 12b is circulated, as it cools the ventilation passage 30, toward the suction side of the fan 11 by the rotation of the fan 11, and it is branched at the exhaust side of the fan 11 into the ventilation passage 31 and the ventilation passage 32. The cooling medium which is branched into the ventilation passage 32 is circulated toward the main cooler 12b as it cools the lower end of the rotor core 6 at the fan 11 side in the ventilation passage 32, the inner surface of the stator core 2 and the outer surface of the rotor core 6 in the air gap 5, the inside of the stator core 2 via the ventilation ducts 4, and the gap between the stator core 2 and the stator housing 1 in the ventilation passage 27, sequentially.

The cooling medium which is branched into the ventilation passage 31 is circulated toward the ventilation passage 34 as it cools the end of the stator core 2 at the fan 11 side and the end of the stator winding 3 in the ventilation passage 31. The cooling medium circulated through the ventilation passage 34 is cooled by the sub cooler 13b on its way. The cooling medium cooled by the sub cooler 13b reaches the outer surface of the stator core 2, cools the inside of the stator core 2 via the ventilation ducts 4 and the inner surface of the stator core 2 and the outer surface of the rotor core 6 in the air gap 5, sequentially, and then meets the cooling medium from the ventilation passage 32 and is circulated together therewith toward the main cooler 12b.

According to the embodiment 1, because a sub or secondary cooler 13, separate from the main or primary cooler 12, is provided midway in the secondary ventilation passage 15 that is branched from the primary ventilation passage 14, the temperature increase distributed along the axial direction in the air gap 5, including the ventilation passages 29 and 32, can be equalized.

That is to say, in a rotating machine where the cooling medium cooled by the coolers installed on both ends of the machine is circulated by means of a multi-flow ventilation system, if the heat load increases as the generation capacity increases, the temperature of the cooling medium increases to some extent before the cooling medium reaches the center of the air gap. Accordingly, the cooling effect at said area becomes low and local heat is generated along the axial direction in the air gap.

According to this embodiment, however, because a sub cooler 13, separate from the main cooler 12, is provided midway in the secondary ventilation passage 15 that is branched from the primary ventilation passage 14 and part of the cooling medium that has been cooled by the main cooler 12 is further cooled by the sub cooler 13, that is, cooled twice through the coolers so that sufficiently cooled cooling medium can be supplied to the center of the air gap, generation of local heat can be restricted and the temperature increase distributed along the axial direction in the air gap 5, including the ventilation passages 29 and 32, can be equalized. As a result, the thermal vibration stroke of the rotor caused by uneven thermal elongation of the rotor along the axial direction can be controlled.

According to the embodiment 1, a small sub cooler 13 having smaller cooling capacity than the main cooler 12 is arranged midway in the secondary ventilation passage 15. The reason for installing a small sub cooler 13 having smaller cooling capacity than the main cooler 12 is that, because the sub cooler 13 is used to cool part of the cooling medium that already has been cooled by the main cooler 12, its cooling capacity can be as small as the capacity of the cooling medium circulated in the secondary ventilation passage 15, so that a higher cooling efficiency can be expected in this system. In addition, sharing the cooling performance by two coolers leads to the advantage that the cooling capacity of the main cooler 12 itself can also be reduced. Because the sub cooler 13 is to be arranged in a smaller space than the space where the main cooler is installed, it must be smaller in size for smooth arrangement.

EMBODIMENT 2

Figure 3:
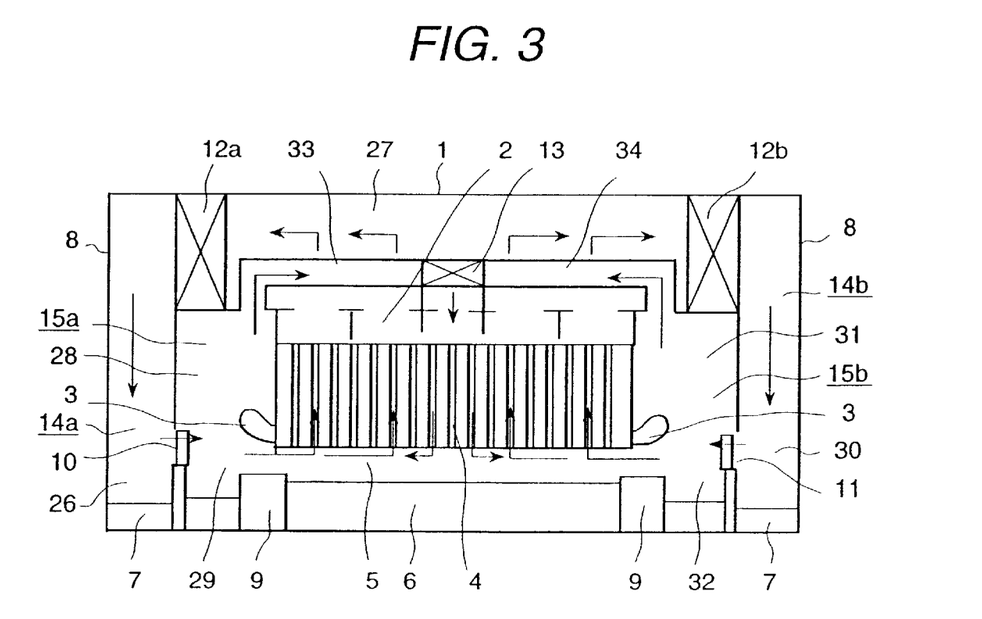
FIG. 3 is a sectional view of the internal composition of a turbine generator according to an embodiment 2 of the present invention, showing an improved construction.

FIG. 3 shows the composition of a turbine generator according to an embodiment 2. This embodiment is a modification of the embodiment 1. According to this embodiment, the ventilation passage 33, which is part of the secondary ventilation passage 15a, and the ventilation passage 34, which is part of the secondary ventilation passage 15b, are joined midway, and a sub cooler 13 is installed at the joint. Viewing the machine from the outside, it can be seen that the main cooler 12 and the sub cooler 13 are arranged in series along the axial direction on top of the machine, such that the main coolers 12a and 12b are located on both ends along the axial direction, and the sub cooler 13 is arranged between the main coolers 12a and 12b.

According to the ventilation system of this embodiment, which is configured as described above, the cooling medium which is branched at the exhaust side of the fan 10 into the ventilation passage 28 and the cooling medium which is branched at the exhaust side of the fan 11 into the ventilation passage 32 are joined before reaching the outer surface of the stator core 2 and are cooled by the sub cooler 13. The cooled cooling medium is circulated from the outer surface of the stator core 2 to the air gap 5 through the ventilation ducts 4 and is branched into the ventilation passages 29 and 32. The cooling medium which is branched into the ventilation passage 29 meets the cooling medium circulated through the ventilation passage 29. The cooling medium which is branched into the ventilation passage 32 meets the cooling medium circulated through the ventilation passage 32.

According to the embodiment 2, because a sub cooler 13, separate from the main cooler 12, is provided midway in the secondary ventilation passage 15 that is branched from the primary ventilation passage 14 and part of the cooling medium that has been cooled by the main cooler 12 is further cooled by the sub cooler 13, that is, cooled twice through the coolers so that sufficiently cooled cooling medium can be supplied to the center of the air gap, generation of local heat can be restricted and the temperature increase distributed along the axial direction in the air gap 5, including the ventilation passages 29 and 32, can be equalized. As a result, as in the previous embodiment, the thermal vibration stroke of the rotor caused by uneven thermal elongation of the rotor along the axial direction can be controlled.

EMBODIMENT 3

Figure 4:
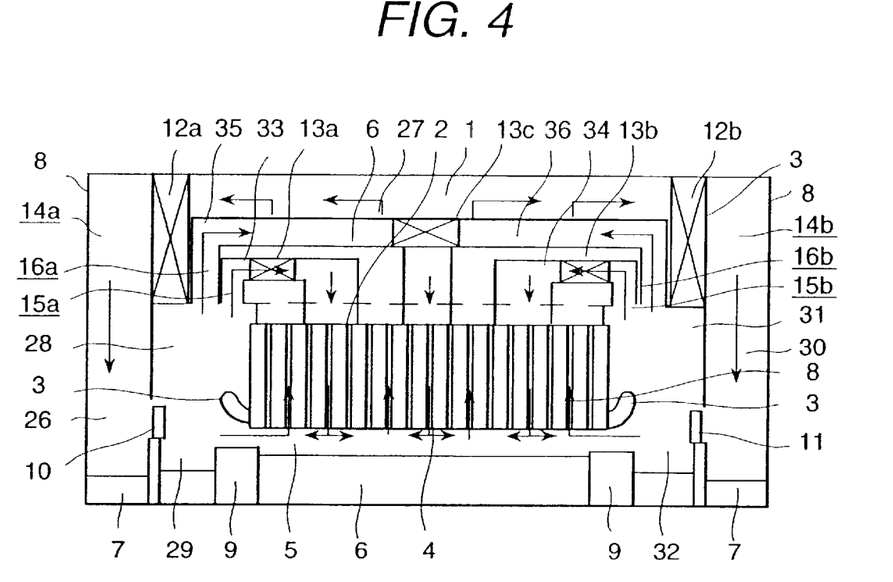
FIG. 4 is a sectional view of the internal composition of a turbine generator according to an embodiment 3 of the present invention, showing a structure which combines the features of FIG. 2 and FIG. 3.

FIG. 4 shows the composition of a turbine generator according to an embodiment 3. This embodiment is a combination of the embodiments 1 and 2. According to this embodiment, the secondary ventilation passage 15 and a tertiary ventilation passage 16 are branched from the primary ventilation passage 14 at the exhaust side of the fan.

To be more specific, the secondary ventilation passage 15a is arranged to run between the exhaust side of the fan 10 and the air gap 5, and it comprises the ventilation passage 28 consisting of the end spaces at the fan 10 side of the stator core 2, the ventilation passage 33 extending from the ventilation passage 28 to the outer surface of the stator core 2, and the ventilation ducts 4. The sub cooler 13a is installed midway in the ventilation passage 33.

The secondary ventilation passage 15b is arranged to run between the exhaust side of the fan 11 and the air gap 5, and it comprises the ventilation passage 31 consisting of the end spaces at the fan 11 side of the stator core 2, the ventilation passage 34 extending from the ventilation passage 31 to the outer surface of the stator core 2, and the ventilation ducts 4. The sub cooler 13b is installed midway in the ventilation passage 34.

In addition, a tertiary ventilation passage 16a is arranged to run between the exhaust side of the fan 10 and the air gap 5, and it comprises the ventilation passage 28 consisting of the end spaces at the fan 10 side of the stator core 2, the ventilation passage 35 extending from the ventilation passage 28 to the outer surface of the stator core 2, and the ventilation ducts 4; and, the tertiary ventilation passage 16b is arranged to run between the exhaust side of the fan 11 and the air gap 5, and it comprises the ventilation passage 31 consisting of the end spaces at the fan 11 side of the stator core 2, the ventilation passage 36 extending from the ventilation passage 31 to the outer surface of the stator core 2, and the ventilation ducts 4.

The ventilation passages 35 and 36 are joined midway. A sub or tertiary cooler 13c is installed at the joint. Viewing the machine from the outside, it is seen that the main cooler 12 and the sub cooler 13 are arranged in series along the axial direction on top of the machine, such that the main coolers 12a and 12b are located on both ends along the axial direction, and the sub or secondary coolers 13a, 13b and the sub or tertiary cooler 13c are arranged between the main coolers 12a and 12b.

According to the ventilation system of this embodiment, configured as described above, the cooling medium which is branched at the exhaust side of the fan 10 into the ventilation passage 28 is circulated through the ventilation passage 28, as it cools the end of the stator core 2 at the fan 10 side, and is branched at the outside of the passage. One part of the branched cooling medium is circulated through the ventilation passage 33 and is cooled by the sub cooler 13a on its way. The cooling medium cooled by the sub cooler 13a reaches the outer surface of the stator core 2 and cools the inside of the stator core 2 via the ventilation ducts 4, and then reaches the air gap 5.

The other part of the branched cooling medium is circulated through the ventilation passage 35, and then meets the cooling medium circulated from the ventilation passage 36, as will be explained later, and is cooled by the sub cooler 13c together therewith. The cooling medium cooled by the sub cooler 13c cools the inside of the stator core 2 via the ventilation ducts 4, and then reaches the air gap 5.

On the other hand, the cooling medium which is branched at the exhaust side of the fan 11 into the ventilation passage 31 is circulated through the ventilation passage 31, as it cools the end of the stator core 2 at the fan 11 side and the end of the stator winding 3, and is branched at the outside of the passage. One part of the branched cooling medium is circulated through the ventilation passage 34 and is cooled by the sub cooler 13b on its way. The cooling medium cooled by the sub cooler 13b reaches the outer surface of the stator core 2 and cools the inside of the stator core 2 via the ventilation ducts 4, and then reaches the air gap 5.

The other part of the branched cooling medium is circulated through the ventilation passage 36, and then meets the cooling medium which is circulated from the ventilation passage 35 on its way and is cooled by the sub cooler 13c together therewith. The cooling medium cooled by the sub cooler 13c cools the inside of the stator core 2 via the ventilation ducts 4, and then reaches the air gap 5.

Besides, the cooling medium which is circulated from the ventilation passage 33 to the air gap 5 through the ventilation ducts 4 is branched at the air gap 5. Then, one part meets the cooling medium which is circulated from the ventilation passage 29, and the other part meets the cooling medium that has been cooled by the sub cooler 13c and circulated to the air gap 5 through the ventilation ducts 4. The cooling medium circulated from the ventilation passage 34 to the air gap 5 through the ventilation ducts 4 is branched at the air gap 5. Then, one part meets the cooling medium circulated from the ventilation passage 32, and the other part meets the cooling medium that has been cooled by the sub cooler 13c and circulated to the air gap 5 through the ventilation ducts 4.

Both the cooling medium that joins the cooling medium which has circulated from the ventilation passage 33 to the air gap 5 through the ventilation ducts 4 and the cooling medium cooled by the sub cooler 13c and circulated to the air gap 5 through the ventilation ducts 4 and the cooling medium that joins the cooling medium circulated from the ventilation passage 34 to the air gap 5 through the ventilation ducts 4 and the cooling medium cooled by the sub cooler 13c and circulated to the air gap 5 through the ventilation ducts 4 are circulated to the ventilation passage 27 through the ventilation ducts 4.

According to the embodiment 3, because a sub cooler 13, separate from the main cooler 12, is provided midway in the secondary ventilation passage 15 that is branched from the primary ventilation passage 14, and another sub cooler 13, separate from the main cooler 12, is provided midway in the tertiary ventilation passage 16 that is branched from the primary ventilation passage 14, and part of the cooling medium that has been cooled by the main cooler 12 is further cooled by the sub cooler 13, that is, cooled twice through the coolers so that sufficiently cooled cooling medium can be supplied to the center of the air gap, generation of local heat can be restricted and the temperature increase distributed along the axial direction in the air gap 5, including the ventilation passages 29 and 32, can be equalized. As a result, as in the previous embodiment, the thermal vibration stroke of the rotor caused by uneven thermal elongation of the rotor along the axial direction can be controlled.

EMBODIMENT 4

Figure 5:
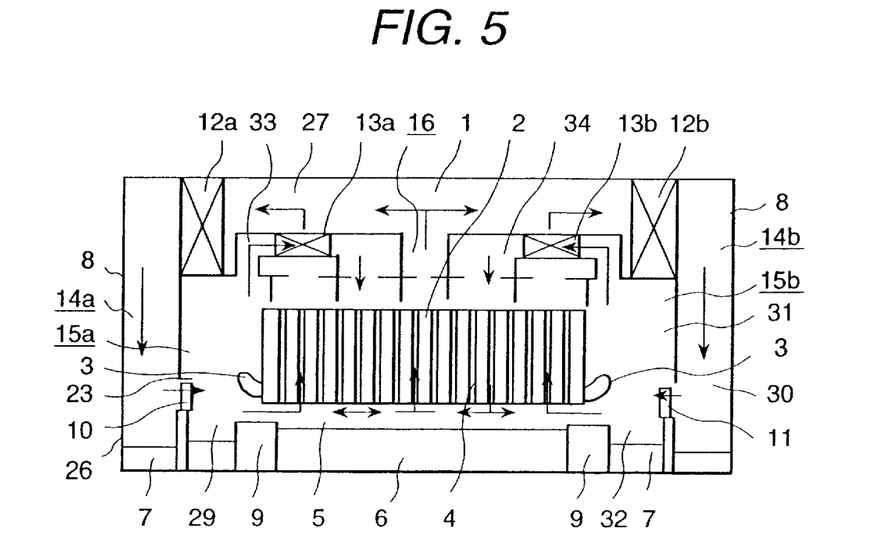
FIG. 5 is a sectional view of the internal composition of a turbine generator according to an embodiment 4 of the present invention, showing an improved construction.

FIG. 5 shows the composition of a turbine generator according to an embodiment 4. This embodiment is a modification of the embodiment 1. According to this embodiment, the tertiary ventilation passage 16 is formed so that one part of the cooling medium that has been cooled by the sub cooler 13a, circulated to the air gap 5 through the ventilation ducts 4 and then branched there, and one part of the cooling medium that has been cooled by the sub cooler 13b, circulated to the air gap 5 through the ventilation ducts 4 and then branched there, are joined and circulated to the ventilation passage 27 through the ventilation ducts 4. The composition as seen from the outside of the machine is similar to that of the embodiment 1.

According to the embodiment 4, because a sub cooler 13, separate from the main cooler 12, is provided midway in the secondary ventilation passage 15 that is branched from the primary ventilation passage 14, and part of the cooling medium that has been cooled by the main cooler 12 is further cooled by the sub cooler 13, that is, cooled twice through the coolers so that sufficiently cooled cooling medium can be supplied to the center of the air gap, generation of local heat can be restricted and the temperature increase distributed along the axial direction in the air gap 5, including the ventilation passages 29 and 32, can be equalized. As a result, similar to the previous embodiment, the thermal vibration stroke of the rotor caused by uneven thermal elongation of the rotor along the axial direction can be controlled.

EMBODIMENT 6

Figure 6:
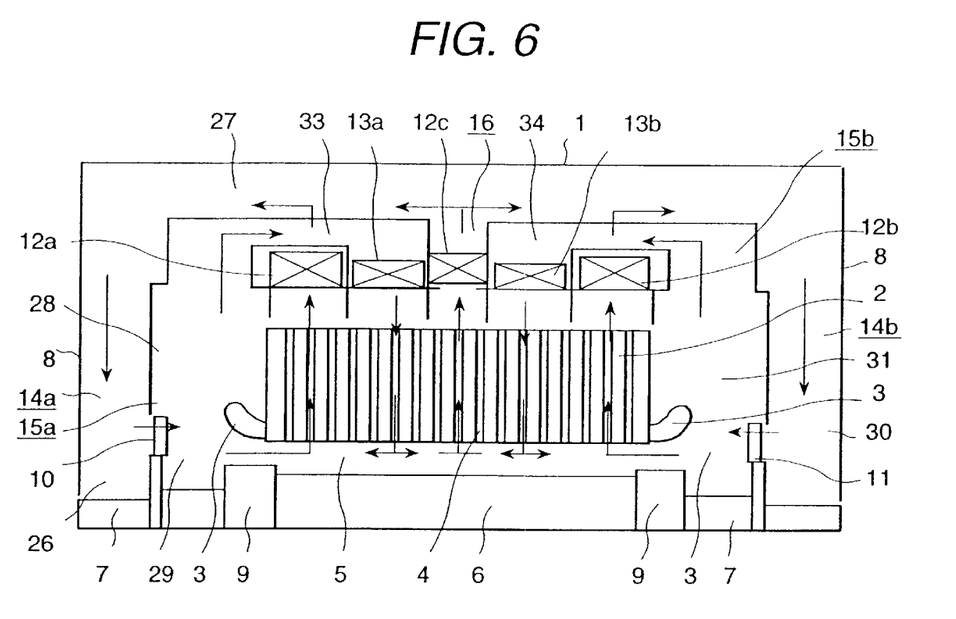
FIG. 6 is a sectional view of the internal composition of a turbine generator according to an embodiment 5 of the present invention, showing an improved construction.

FIG. 6 shows the composition of a turbine generator according to an embodiment 5. This embodiment is a modification of the embodiment 4. According to this embodiment, the locations and the number of units of the main coolers are different. The main cooler 12a is installed in the ventilation passage which extends from the ventilation ducts 4 of the primary ventilation passage 14a to the ventilation passage 27, and the main cooler 12b is installed in the ventilation passage which extends from the ventilation ducts 4 of the primary ventilation passage 14b to the ventilation passage 27. In addition, the main cooler 12c is newly installed in the ventilation passage which extends from the ventilation ducts 4 of the tertiary ventilation passage to the ventilation passage 27. In the same manner as in the embodiment 4, the sub cooler 13a is installed in the ventilation passage 33 and the sub cooler 13b is installed in the ventilation passage 34. Viewing the machine from the outside, it is seen that the main cooler 12 and the sub cooler 13 are arranged in series along the axial direction on top of the machine, such that the main coolers 12a, 12b and 12c are located separately along the axial direction, the sub cooler 13a is arranged between the main coolers 12a and 12c, and the sub cooler 13b is arranged between the main coolers 12b and 12c.

According to the embodiment 5, because a sub cooler 13, separate from the main cooler 12, is provided midway in the secondary ventilation passage 15 that is branched from the primary ventilation passage 14, and part of the cooling medium that has been cooled by the main cooler 12 is further cooled by the sub cooler 13, that is, cooled twice through the coolers so that sufficiently cooled cooling medium can be supplied to the center of the air gap, generation of local heat can be restricted and the temperature increase distributed along the axial direction in the air gap 5, including the ventilation passages 29 and 32, can be equalized. As a result, as in the previous embodiment, the thermal vibration stroke of the rotor caused by uneven thermal elongation of the rotor along the axial direction can be controlled.

EMBODIMENT 6

Figure 7:
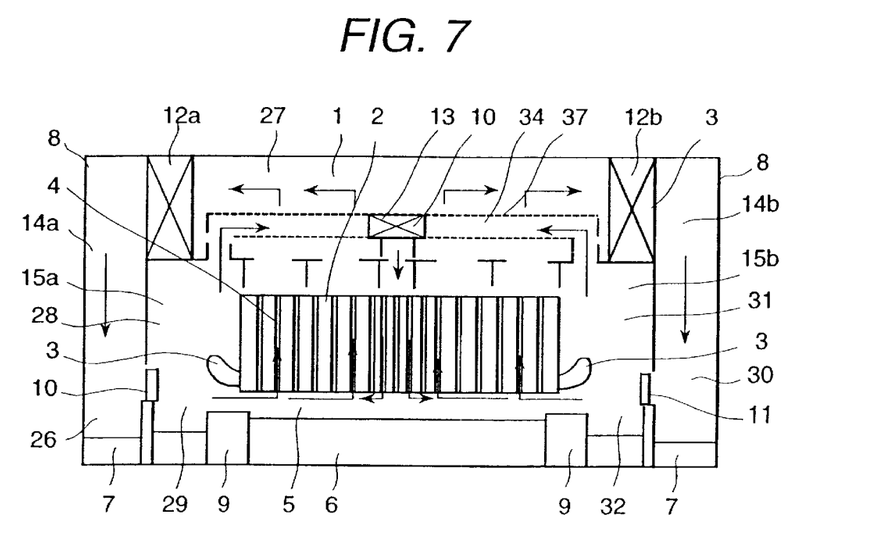
FIG. 7 is a sectional view of the internal composition of a turbine generator according to an embodiment 6 of the present invention, showing an improved construction.

FIG. 7 shows the composition of a turbine generator according to an embodiment 6. This embodiment is a modification of the embodiment 2. According to this embodiment, thermal insulation 37 is provided for the ventilation passages 33 and 34. The thermal insulation 37 is made of insulation material, such as glass wool, and is laid around the inner or outer wall of the ventilation passages.

The reason for installing the thermal insulation 37 is that, because the ventilation passages 33 and 34 are installed inside the ventilation passage for the cooling medium that is circulated from the air gap 5 to the outer surface of the stator core 2 through the ventilation duct, that is, the cooling medium that has been utilized to cool the stator core 2 and which becomes hot, the cooling medium circulated through the ventilation passages 33 and 34 are subjected to heat exchange with the cooling medium circulated from the air gap 5 to the outer surface of the stator core 2 through the ventilation duct. If any heat is to be exchanged, the cooling effect of the sub cooler 13 installed at the joint of the ventilation passages 33 and 34 will be reduced and, as a result, the cooling effect at the center of the air gap 5 will also be reduced.

For this reason, according to this embodiment, the thermal insulation 37 is laid over the inner or outer walls of the ventilation passages 33 and 34 so as to eliminate possible heat exchange with the cooling medium circulated from the air gap 5 to the outer surface of the stator core 2 through the ventilation ducts 4, so that the effectiveness of the embodiment 2 can be enhanced further.

In addition, according to this embodiment, the axial pitch of the ventilation ducts 4 is varied. In short, in order to equalize the temperature increase distribution, it is important to circulate the cooling medium effectively onto the locally heated area. Thus, according to this embodiment, the axial pitch of the ventilation ducts 4, through which the cooling medium is circulated from the air gap 5 to the outer surface of the stator core 2, is made longer, and, as a result, the equivalent ventilation area per unit length is reduced so as to control the flow rate of the cooling medium circulated to the outer surface of the stator core 2.

In addition, by reducing the axial pitch of the ventilation ducts 4 through which the cooling medium is circulated from the outer surface of the stator core 2 to the air gap 5 and, as a result, by increasing the equivalent ventilation area per unit length, the flow rate of the cooling medium circulated to the center of the air gap 5 is increased.

According to this embodiment, because more cooling medium can be supplied to the center of the air gap 5, as indicated above, and cool it better, the effectiveness of the embodiment 2 can be enhanced further. It is noted that the features of this embodiment can be applied not only to the embodiment 2, but to the other embodiments as well.

EMBODIMENT 7

Figure 8:
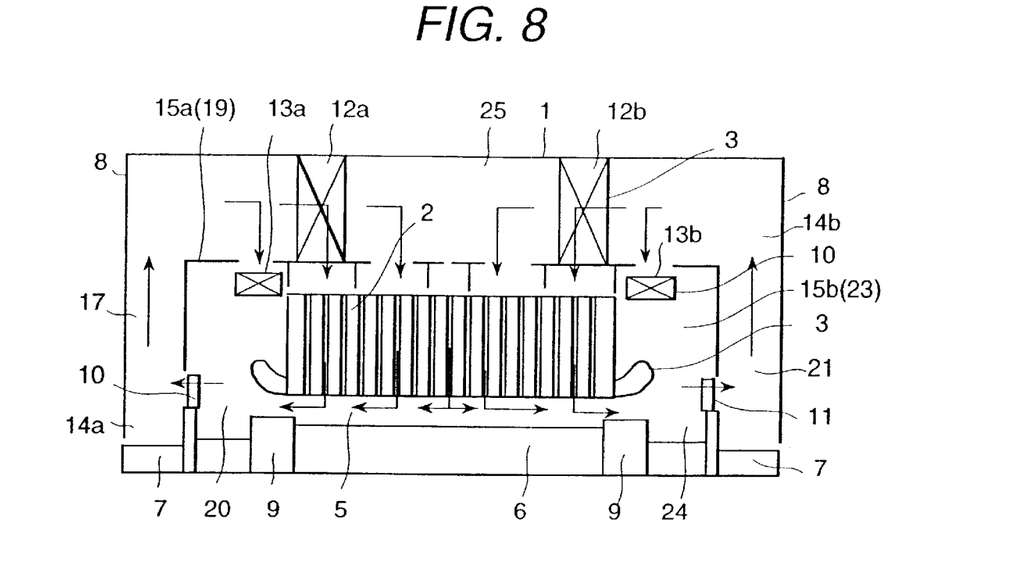
FIG. 8 is a sectional view of a turbine generator according to an embodiment 7 of the present invention.

FIG. 8 shows the composition of a turbine generator according to an embodiment 7. This embodiment employs a so-called single reverse-flow system, where the cooling medium cooled by a cooler is circulated in one direction from the outer surface of the stator core 2 to the air gap 5 through the ventilation ducts 4.

Because of this system, a primary ventilation passage 14a is arranged to run inside the machine, and it comprises a ventilation passage 17 extending from the exhaust side of fan 10 to the inner surface of the stator housing 1, a ventilation passage 25 extending from the outer surface of the stator core 2 to the inner surface of the stator housing 1, the ventilation ducts 4, the air gap 5, and a ventilation passage 20 extending from the air gap 5 to the suction side of the fan 10. The main cooler 12a is arranged in the ventilation passage 25 that is opposite to the outside of the end spaces at the fan 10 side of the stator core 2.

A primary ventilation passage 14b is also arranged to run inside the machine, and it comprises a ventilation passage 21 extending from the exhaust side of the fan 11 to the inner surface of the stator housing 1, a ventilation passage 25 extending from the outer surface of the stator core 2 to the inner surface of the stator housing 1, the ventilation ducts 4, the air gap 5, and a ventilation passage 24 extending from the air gap 5 to the suction side of the fan 11. The main cooler 12b is arranged in the ventilation passage 25 that is opposite to the outside of the end spaces at the fan 11 side of the stator core 2.

The ventilation passage 19, which is the secondary ventilation passage 15a, comprising the end spaces at the fan 10 side of the stator core 2, is arranged between this side of the main cooler 12a in the ventilation passage 17 and the ventilation passage 20. The sub cooler 13a is installed close to the periphery (branched side from the ventilation passage 17) in the secondary ventilation passage 15a. The ventilation passage 23, which is the secondary ventilation passage 15a, comprising the end spaces at the fan 11 side of the stator core 2 is arranged between this side of the main cooler 12b in the ventilation passage 21 and the ventilation passage 24. The sub cooler 13a is installed close to the periphery (branched side from the ventilation passage 21) in the secondary ventilation passage 15a.

The primary ventilation passages 14a and 14b, and also the secondary ventilation passages 15a and 15b, are symmetrically arranged about an axis perpendicular to the rotating shaft 7, respectively. The main cooler 12 and the sub cooler 13 differ in cooling capacity, and, according to this embodiment, the cooling capacity of the sub cooler 13 is smaller than that of the main cooler 12. Accordingly, the sub cooler 13 is smaller in size than the main cooler 12. The main coolers 12a and 12b, and also the sub coolers 13a and 13b, are symmetrically arranged about an axis perpendicular to the rotating shaft 7. Viewing the machine from the outside, it is seen that the main cooler 12 and the sub cooler 13 are arranged in series along the axial direction on top of the machine, such that the sub coolers 13a and 13b are located on both ends along the axial direction, and the main coolers 12a and 12b are arranged between the sub coolers 13a and 13b. Description of the other composition is omitted because it is similar to that of the previous embodiment.

Hereunder, the circulation of the cooling medium will be explained. The cooling medium cooled by the main cooler 12a is circulated toward the suction side of the fan 10 by the rotation of the fan 10, and cools the gap between the stator core 2 and the stator housing 1 in the ventilation passage 25, the inside of the stator core 2 via the ventilation ducts 4, the inner surface of the stator core 2 and the outer surface of the rotor core 6 in the air gap 5, and the end of the rotor core 6 at the fan 10 side in the ventilation passage 20, sequentially.

The cooling medium, which is cooled by the sub cooler 13a, is circulated toward the suction side of the fan 10 through the ventilation passage 19 and cools the end of the stator core 2 at the fan 10 side and the end of the stator winding 3. The two cooling medium flows cooled by each cooler and circulated separately are joined at the suction side of the fan 10 and are circulated from the exhaust side of the fan 10 toward the main cooler 12a, as they cool the ventilation passage 17, and then the flow is branched before the main cooler 12a into cooling medium flowing toward the main cooler 12a side and cooling medium flowing toward the sub cooler 13a side.

On the other hand, the cooling medium, which is cooled by the main cooler 12b, is circulated toward the suction side of the fan 11 by the rotation of the fan 11 and cools the gap between the stator core 2 and the stator housing 1 in the ventilation passage 25, the inside of the stator core 2 via the ventilation ducts 4, the inner surface of the stator core 2 and the outer surface of the rotor core 6 in the air gap 5, and the end of the rotor core 6 at the fan 11 side in the ventilation passage 24, sequentially.

The cooling medium, which is cooled by the sub cooler 13b, is circulated toward the suction side of the fan 11 through the ventilation passage 23 and cools the end of the stator core 2 at the fan 11 side and the end of the stator winding 3. The two cooling medium flows cooled by each cooler and circulated separately are joined at the suction side of the fan 11 and are circulated from the exhaust side of the fan 11 toward the main cooler 12b, as they cool the ventilation passage 21, and then the flow is branched before the main cooler 12b into cooling medium flowing toward the main cooler 12b side and cooling medium flowing toward the sub cooler 13b side.

According to the embodiment 7, because the secondary ventilation passage 15, which is branched before the main cooler 12 in the primary ventilation passage 14, is arranged to run in the machine and a sub cooler 13 is provided in the branched flow separate from the main cooler 12, the temperature increase distributed along the axial direction in the air gap 5, including the ventilation passages 20 and 24, can be equalized.

That is to say, in a rotating machine where the cooling medium which is cooled by coolers installed on both ends of the machine is circulated by a single reverse-flow ventilation system, if the heat load increases as the generation capacity increases, the temperature of the cooling medium increases before the cooling medium reaches the suction side of the fan. Accordingly, the cooling effect at said area becomes low and local heat is generated along the axial direction in the air gap.

According to this embodiment, however, because the secondary ventilation passage 15, which is branched before the main cooler 12 in the primary ventilation passage 14, is arranged to run in the machine and a sub cooler 13 is provided in the branched flow separate from the main cooler 12, generation of local heat can be restricted and the temperature increase distributed along the axial direction in the air gap 5, including the ventilation passage 20 and 24, can be equalized. As a result, the thermal vibration stroke of the rotor caused by uneven thermal elongation of the rotor along the axial direction can be controlled.

According to the embodiment 7, a small sub cooler 13 having smaller cooling capacity than the main cooler 12 is arranged midway in the secondary ventilation passage 15. The reason for installing a small sub cooler 13 having smaller cooling capacity than the main cooler 12 is that, because the sub cooler 13 is used to cool part of the cooling medium that has already been cooled by the main cooler 12, its cooling capacity can be as small as the capacity of the cooling medium circulated in the secondary ventilation passage 15, so that a higher cooling efficiency can be expected in this system. In addition, sharing the cooling performance leads to the advantage that the cooling capacity of the main cooler 12 itself can also be reduced. Because the sub cooler 13 is to be arranged in a smaller space than the space where the main cooler is installed, it must be smaller in size for smooth arrangement.

EMBODIMENT 8

Figure 9:
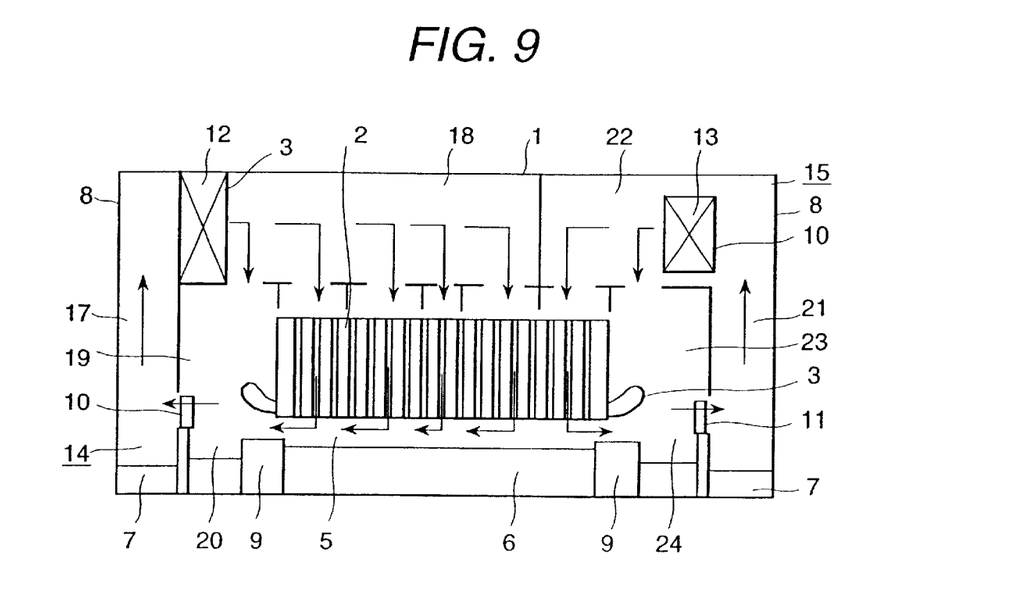
FIG. 9 is a sectional view of the internal composition of a turbine generator according to an embodiment 8 of the present invention.

FIG. 9 shows the composition of a turbine generator according to the embodiment 8. This embodiment, similar to the embodiment 7, employs a so-called single reverse-flow system, where the cooling medium cooled by a cooler is circulated in one direction from the outer side of the stator core 2 to the air gap 5 through the ventilation ducts 4.

Because of this system, a primary ventilation passage 14 is arranged to run inside the machine, and comprises the ventilation passage 17 extending from the exhaust side of the fan 10 to the inner surface of the stator housing 1, ventilation passage 18 disposed between the stator core 2 and the stator housing 1, including the end spaces of the stator core 2, the ventilation ducts 4, the ventilation passage 19 consisting of the end spaces at the fan 10 side of the stator core 2, the air gap 5, and the ventilation passage 20 from the air gap 5 to the suction side of the fan 10. The main cooler 12 is arranged in the ventilation passage 18 opposite to the fan 10.

A primary ventilation passage 15 is also arranged to run inside the machine, and comprises the ventilation passage 21 extending from the exhaust side of the fan 11 to the inner surface of the stator housing 1, ventilation passage 22 disposed between the outer surface of the stator core 2 and the stator housing 1, including the end spaces of the stator core 2, the ventilation ducts 4, the ventilation passage 23 consisting of the end spaces at the fan 11 side of the stator core 2, the air gap 5, and the ventilation passage 24 from the air gap 5 to the suction side of the fan 11. The sub cooler 13 is arranged in the ventilation passage 22 opposite to the fan 11.

The primary ventilation passage 14 and the secondary ventilation passage 15 differ in length of the ventilation passage, and, according to this embodiment, the length of the secondary ventilation passage is shorter than that of the primary ventilation passage 14. In addition, the main cooler 12 and the sub cooler 13 differ in cooling capacity, and, according to this embodiment, the cooling capacity of the sub cooler 13 is smaller than that of the main cooler 12. Accordingly, the sub cooler 13 is smaller in size than the main cooler 12. Besides, the main cooler 12 and the sub cooler 13 are arranged symmetrically about an axis perpendicular to the rotating shaft 7. Viewing the machine from the outside, it is seen that the main cooler 12 and the sub cooler 13 are arranged in series along the axial direction on top of the machine, such that the main cooler is located on one end along the axial direction, and the sub cooler 13 is arranged on the other end along the axial direction. Description of the other composition is omitted because it is similar to that of the previous embodiment.

Hereunder, the circulation of the cooling medium will be explained. The cooling medium cooled by the main cooler 12 is circulated and branched into the ventilation passage 18 and the ventilation passage 19 by the rotation of the fan 10. The cooling medium circulated into the ventilation passage 18 cools the gap between the stator core 2 and the stator housing 1 in the ventilation passage 18, the inside of the stator core 2 via the ventilation ducts 4, the inner surface of the stator core 2 and the outer surface of the rotor core 6 in the air gap 5, and the end of the rotor core 6 at the fan 10 side in the ventilation passage 20, sequentially, and then it is circulated toward the suction side of the fan 10.

The cooling medium, which is circulated in the ventilation passage 19, cools the end of the stator core 2 at the fan 10 side and the end of the stator winding 3, and then it is circulated toward the suction side of the fan 10. The two cooling medium flows are joined at the suction side of the fan 10. The joined cooling medium is circulated, as it cools the ventilation passage 17, from the exhaust side of the fan 10 toward the main cooler 12 and is cooled again by the main cooler 12.

On the other hand, the cooling medium, which is cooled by the sub cooler 13, is circulated and branched into the ventilation passage 22 and the ventilation passage 23 by the rotation of the fan 11. The cooling medium circulated into the ventilation passage 22 cools the gap between the stator core 2 and the stator housing 1 in the ventilation passage 22, the inside of the stator core 2 via the ventilation ducts 4, the inner surface of the stator core 2 and the outer surface of the rotor core 6 in the air gap 5, and the end of the rotor core 6 at the fan 11 side in the ventilation passage 24, sequentially, and then it is circulated toward the suction side of the fan 11.

The cooling medium which is circulated in the ventilation passage 23, cools the end of the stator core 2 at the fan 11 side and the end of the stator winding 3, and then it is circulated toward the suction side of the fan 11. The two cooling medium flows are joined at the suction side of the fan 11. The joined cooling medium is circulated, as it cools the ventilation passage 21, from the exhaust side of the fan 11 toward the sub cooler 13 and is cooled again by the sub cooler 13.

According to the embodiment 8, because the secondary ventilation passage 15, which has a shorter passage length than the primary ventilation passage 14, is arranged to run in the machine and a sub cooler 13 is provided in the ventilation passage separate from the main cooler 12, the temperature increase distributed along the axial direction in the air gap 5, including the ventilation passage 20 and 24, can be equalized.

That is to say, in a rotating machine where the cooling medium cooled by the cooler installed on either end of the machine is circulated by means of a single reverse-flow ventilation system, if the heat load increases as the generation capacity increases, the temperature of the cooling medium increases before the cooling medium reaches the fan located apart from the cooler (the other end inside of the machine). Accordingly, the cooling effect at said area becomes low and local heat is generated along the axial direction in the air gap.

According to this embodiment, however, because the secondary ventilation passage 15, which has a shorter passage length than the primary ventilation passage 14, is arranged to run in the machine and a sub cooler 13 is provided in the ventilation passage separate from the main cooler 12, generation of local heat can be restricted and the temperature increase distributed along the axial direction in the air gap 5, including the ventilation passages 20 and 24, can be equalized. As a result, the thermal vibration stroke of the rotor caused by uneven thermal elongation of the rotor along the axial direction can be controlled.

According to the embodiment 8, a small sub cooler 13 having smaller cooling capacity than the main cooler 12 is arranged midway in the secondary ventilation passage 15. The reason for installing a small sub cooler 13 having smaller cooling capacity than the main cooler 12 is that, because the sub cooler 13 is used to cool the cooling medium to be circulated in the secondary ventilation passage which is shorter in length than the primary ventilation passage 14 where the main cooler 12 is installed, its cooling capacity can be as small as the capacity of the cooling medium circulated in the secondary ventilation passage 15, so that a higher cooling efficiency can be expected in this system.

What is claimed is:

1. A rotating machine having a core and being equipped with coolers for cooling a cooling medium which is circulated inside the machine by rotation of a fan installed on a rotating axis, said coolers being installed in a ventilation passage for said cooling medium and comprising a primary cooler installed in a primary ventilation passage extending from an exhaust side of said fan to a suction side of said fan via the core, and a secondary cooler installed at a point of a joint in a secondary ventilation passage that is branched from said primary ventilation passage and is joined with another ventilation passage midway at the point of said joint.

2. A rotating machine having a core and being equipped with coolers for cooling a cooling medium which is circulated inside the machine by rotation of a fan installed on a rotating axis, said coolers being installed in a ventilation passage for said cooling medium and comprising a primary cooler installed in a primary ventilation passage extending from an exhaust side of said fan to a suction side of said fan via the core, a secondary cooler installed in a secondary ventilation passage that is branched from said primary ventilation passage, and a tertiary cooler installed at a point of a joint in a tertiary ventilation passage that is branched from said primary ventilation passage and is joined with another ventilation passage midway at the point of the joint.

3. A rotating machine having a stator core and being equipped with coolers for cooling a cooling medium which is circulated inside the machine by rotation of a fan installed on a rotating axis, said coolers being installed in a ventilation passage for said cooling medium and comprising a primary cooler installed in primary ventilation passage extending from an exhaust side of the fan installed on the rotating axis to a suction side of the fan via one portion of the stator core arranged in an axial direction of the stator core, said primary cooler enabling cooling of the cooling medium in the primary ventilation passage, and a secondary cooler installed in a secondary passage that is branched from said primary ventilation passage which further cools a portion of the cooling medium cooled by said primary cooler, said secondary passage providing a path for the cooling medium which extends through another portion of the stator core arranged nearer to a central portion of the stator core arranged in the axial direction of the stator core than the one portion.

4. A rotating machine according to claim 3, wherein said primary cooler and said second cooler have different cooling capacities.

5. A rotating machine according to claim 4, wherein said secondary cooler has a smaller cooling capacity than the cooling capacity of said primary cooler.

6. A rotating machine according to claim 3, wherein a length of said primary ventilation passage from the exhaust side of the fan to the stator core is smaller than a length of said secondary passage from the exhaust side of the fan to the stator core.

7. A rotating machine according to claim 3, wherein the cooling medium is air.

8. A rotating machine having a stator core and being equipped with coolers for cooling a cooling medium which is circulated inside the machine by rotation of a fan installed on a rotating axis, said coolers being installed in a ventilation passage for said cooling medium and comprising a primary cooler installed in primary ventilation passage extending from an exhaust side of the fan installed on the rotating axis to a suction side of the fan via one portion of the stator core arranged in an axial direction of the stator core, said primary cooler enabling cooling of the cooling medium in the primary ventilation passage, and a secondary cooler installed in a secondary passage that is branched from said primary ventilation passage which further cools a portion of the cooling medium cooled by said primary cooler, said secondary passage providing a path for the cooling medium which extends from the exhaust side of the fan through another portion of the stator core arranged in the axial direction via an end of a stator winding and said secondary cooler.

9. A rotating machine according to claim 8, wherein said primary cooler and said second cooler have different cooling capacities.

10. A rotating machine according to claim 9, wherein said secondary cooler has a smaller cooling capacity than the cooling capacity of said primary cooler.

11. A rotating machine according to claim 8, wherein a length of said primary ventilation passage from the exhaust side of the fan to the stator core is smaller than a length of said secondary passage from the exhaust side of the fan to the stator core.

12. A rotating machine according to claim 8, wherein the cooling medium is air.

13. A rotating machine having a core and being equipped with coolers for cooling a cooling medium which is circulated inside the machine by rotation of a fan installed on a rotating axis, said coolers being installed in a ventilation passage for said cooling medium and comprising a primary cooler installed in a primary ventilation passage extending from an exhaust side of the fan installed on the rotating axis to a suction side of the fan via the stator core so that the cooling medium circulating in said primary ventilation passage passes through the stator core in a first direction, and a secondary cooler installed in a secondary passage that is branched from said primary ventilation passage, said secondary passage providing a path for the cooling medium which extends through the stator core so that the cooling medium circulating in said second passage passes through the stator core in a second direction which is opposite to the first direction.

14. A rotating machine according to claim 13, wherein said primary cooler and said second cooler have different cooling capacities.

15. A rotating machine according to claim 14, wherein said secondary cooler has a smaller cooling capacity than the cooling capacity of said primary cooler.

16. A rotating machine according to claim 13, wherein a length of said primary ventilation passage from the exhaust side of the fan to the stator core is smaller than a length of said secondary passage from the exhaust side of the fan to the stator core.

17. A rotating machine according to claim 13, wherein the cooling medium is air.

18. A rotating machine according to claim 13, wherein said primary cooler cools the cooling medium in the primary ventilation passage and said secondary cooler further cools a portion of the cooling medium cooled by said primary cooler.

19. A rotating machine according to claim 18, wherein the cooling medium circulating in said primary ventilation passage passes through the stator core in the first direction at one portion of the stator core arranged in an axial direction of the stator core, and the cooling medium circulating in said secondary passage passes through the stator core in the second direction at another portion of the stator core arranged nearer to a central portion of the stator core in the axial direction of the stator core than the one portion.

20. A rotating machine according to claim 19, wherein the path provided by said secondary passage further extends from the exhaust side of said fan through said another portion of the stator core via an end of a stator winding and said secondary cooler.

* * * * *